US010853185B1

(12) United States Patent
Guo et al.

(10) Patent No.: US 10,853,185 B1
(45) Date of Patent: Dec. 1, 2020

(54) VIRTUAL MACHINE IMAGE BACKUP TO EXCLUDE SYSTEM PAGE FILE

(71) Applicant: EMC IP Holding Company LLC, Hopkinton, MA (US)

(72) Inventors: Crystal Guo, Shanghai (CN); Walter Wang, Shanghai (CN); Derro Xu, Chenghua (CN); Qingxiao Zheng, Chengdu (CN); Baoli Guo, Sichuan (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 403 days.

(21) Appl. No.: 15/717,184

(22) Filed: Sep. 27, 2017

(51) Int. Cl.
*G06F 11/14* (2006.01)
*G06F 9/455* (2018.01)
*G06F 16/11* (2019.01)

(52) U.S. Cl.
CPC ...... *G06F 11/1453* (2013.01); *G06F 9/45558* (2013.01); *G06F 11/1464* (2013.01); *G06F 16/128* (2019.01); *G06F 2009/45583* (2013.01); *G06F 2009/45595* (2013.01); *G06F 2201/84* (2013.01)

(58) Field of Classification Search
CPC .............. G06F 11/1453; G06F 16/128; G06F 11/1464; G06F 9/45558; G06F 2201/84; G06F 2009/45583; G06F 2009/45595
See application file for complete search history.

(56) References Cited

U.S. PATENT DOCUMENTS

| 5,977,889 A * | 11/1999 | Cohen | H03M 7/30 341/55 |
| 7,254,682 B1 * | 8/2007 | Arbon | G06F 11/1435 711/161 |
| 8,285,957 B1 * | 10/2012 | Nag | G06F 16/1748 711/162 |
| 8,335,902 B1 * | 12/2012 | Feathergill | G06F 11/1466 711/161 |
| 8,346,727 B1 * | 1/2013 | Chester | G06F 16/188 707/640 |
| 8,364,639 B1 * | 1/2013 | Koryakina | G06F 11/1458 707/639 |
| 8,566,542 B1 * | 10/2013 | Wang | G06F 11/1456 711/114 |
| 9,235,582 B1 * | 1/2016 | Madiraju Varadaraju | G06F 11/1451 |

(Continued)

*Primary Examiner* — Pierre M Vital
*Assistant Examiner* — Zuheir A Mheir
(74) *Attorney, Agent, or Firm* — Womble Bond Dickinson (US) LLP (57) ABSTRACT

According to one embodiment, a system in response to a request to back up a virtual machine to a backup storage system, generates a snapshot of the virtual machine. The system identifies one or more files within the snapshot that satisfy a predetermined criterion. If the one or more files are identified, the storage system backs up a modified representation of the snapshot by, analyzing the snapshot to determine addresses of the identified one or more files within the snapshot, and substituting content of the identified one or more files at the addresses with a predetermined data pattern. The system deduplicates the modified representation of the snapshot to remove duplicated data segments and copies data segments of the modified representation of the snapshot to the backup storage system such that data segments to be copied to the backup storage system is minimized.

19 Claims, 5 Drawing Sheets

(56) References Cited

U.S. PATENT DOCUMENTS

| | | | |
|---|---|---|---|
| 10,324,795 B2* | 6/2019 | Yang | G06F 21/53 |
| 2006/0206536 A1* | 9/2006 | Sawdon | G06F 11/1435 |
| 2014/0095816 A1* | 4/2014 | Hsu | G06F 11/1469 |
| | | | 711/162 |
| 2014/0351808 A1* | 11/2014 | Srinivasan | G06F 3/0608 |
| | | | 718/1 |
| 2016/0019317 A1* | 1/2016 | Pawar | G06F 16/907 |
| | | | 707/649 |
| 2016/0292001 A1* | 10/2016 | Park | G06F 16/172 |

* cited by examiner

VIRTUAL MACHINE IMAGE BACKUP TO EXCLUDE SYSTEM PAGE FILE

FIELD OF THE INVENTION

Embodiments of the present invention relate generally to data storage systems. More particularly, embodiments of the invention relate to virtual machine (VM) image backup.

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). This results in higher server utilization but also means that there are fewer server resources available to perform backup and/or restore. The problem is compounded by the unabated growth in data and applications, which makes it ever more difficult to complete backup and/or restore within the available time window.

One approach is to back up at the VM level. Virtualization vendors such as VMware provide a set of application programming interfaces (APIs) for a backup application. One may use a VM API such as VMware's vStorage APIs for Data Protection (VADP) to pull the data out of the virtual infrastructure and onto a backup storage system. This typically requires routing the data through a proxy server.

When a virtual machine image backup is performed, typically files cannot be excluded from the backup image. All data on the virtual machine would be backed up as a whole image even if some data is unessential for restoration, such as a system page file or other temporary files.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a client has a virtual machine monitor or manager (VMM), and each hosts one or more virtual machines (VMs). The client has a storage system associated with it to store data and an application programming interface (API) via which the VMs are managed. An example of VM API is VMware's vStorage APIs for Data Protection (VADP). A request for backing up a VM is sent from a backup application to the client. The VMM, in response to a request to back up a VM to a backup storage system, establishes a consistent state of the VM and generates a snapshot of the VM. The VMM identifies one or more files within the snapshot that satisfy a predetermined criterion. If the one or more file is identified, the VMM dynamically backs up a modified representation of the snapshot (e.g., the snapshot excluding one or more files within the snapshot in substitution with a predetermined data pattern) by analyzing the snapshot to determine start and end addresses of the identified one or more files within the snapshot and substituting content of the identified one or more files at the determined addresses with a predetermined data pattern. In one embodiment, an Avamar client processes the backup data by deduplicating duplicate data segments or trunks (e.g., 64 KB). For the substituted one or more files with predetermined data pattern (e.g., repeated 64 KB data trunks), only one copy of the data trunk (e.g., 64 KB) will be sent to the target backup storage system, only once. The removed duplicates will reference the only copy. Therefore, transmitting the substituted one or more files with predetermined data pattern reduces the overall transmission bandwidth and overall server storage capacity.

In one embodiment, the backup application can use VM API to ask the VMM to delete the snapshot after the backup process completes or terminates, which causes the snapshot to be deleted from a storage system. In one embodiment, backing up the modified representation of the snapshot includes parsing the modified representation of the snapshot at a storage system to populate a file catalog. In another embodiment, the modified representation of the snapshot is reconstructed from the deduplicated modified representation of the snapshot to parse the modified representation of the snapshot at the target backup storage system to populate a file catalog. Metadata in the snapshot are interpreted to determine information about the files contained in the snapshot. Such information includes file attributes such as file name, access control information, and information about layout of the file within the disk snapshots. Such information is then used to populate a backup catalog of the files in the backed up VM.

In one embodiment, the request for backing up a VM is sent from a backup application of the storage system associated with the clients. In another embodiment, the request for backing up a VM is sent from a backup application server. In another embodiment, the request for backing up a VM is sent from a VM Management server that manages multiple clients over a network, each client containing one or more VMs and each client has access to storage system. In one embodiment, the VM Management server can be a part of the backup application server. In another embodiment, the request for backing up a VM is sent from a backup application of the target backup storage system.

Figure 1:
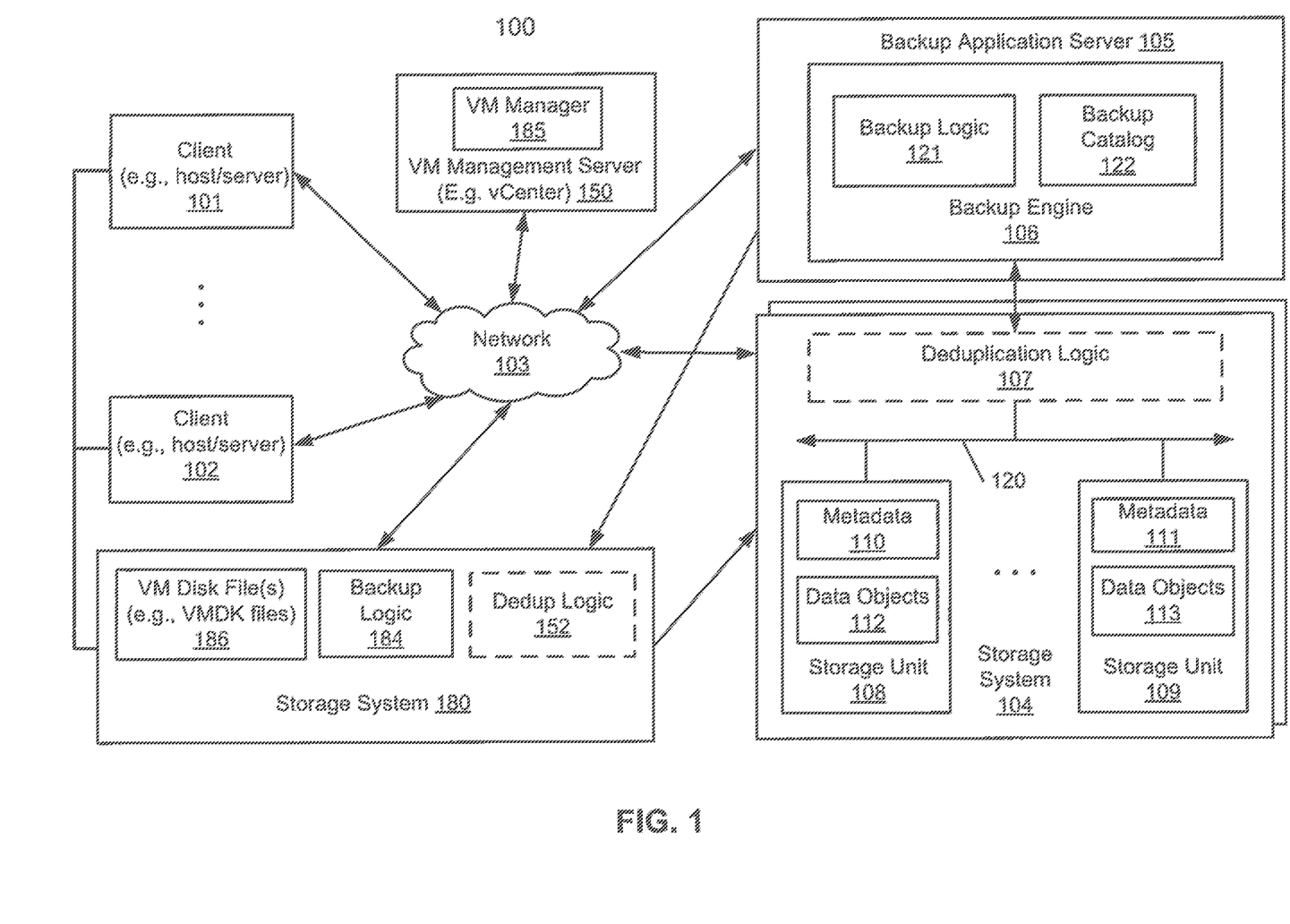
FIG. 1 is a block diagram illustrating a storage system according to one embodiment.

FIG. 1 is a block diagram illustrating a storage system according to one embodiment. Referring to FIG. 1, system 100 includes, but is not limited to, one or more client systems 101-102 communicatively coupled to storage system 104, backup application server 105, VM Management server 150 (also referred to as virtual center or vCenter), and storage system 180 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as backup storage system 104. Network 103 may be any type of networks such as a local area network (LAN), a wide area network (WAN) such as the Internet, a fiber network, a storage network, or a combination thereof, wired or wireless.

Backup storage system 104 may include or represent any type of servers or a cluster of one or more servers (e.g., cloud servers). For example, backup storage system 104 may be a storage server used for various different purposes, such as to provide multiple users or client systems with access to shared data and/or to back up (or restore) data (e.g., mission critical data). Backup storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Backup storage system 104 may further provide storage services via an object-based protocol and Hadoop distributed file system (HDFS) protocol.

In one embodiment, backup application server 105 includes, but is not limited to, backup engine 106 which contains a backup catalog 122 and backup logic 121. Backup application server 105 coordinates with backup storage system 104, storage system 180, and clients 101-102 to run various backup operations. Backup logic 121 includes backup logic configured to receive and back up data from a client (e.g., clients 101-102) and to store the backup data in any one or more of storage units 108-109, and restore logic configured to retrieve and restore backup data from any one or more of storage units 108-109 back to a client (e.g., clients 101-102).

In one embodiment, VM Management server 150 includes, but is not limited to, VM Manager 185. VM Management server 150 manages VM configuration information of client 102. A VM Management server may manage VM configuration information of multiple clients, and each client contains one or more VMs managed by a VMM running therein. A VM Management server may be communicatively coupled with clients, backup application server, and backup storage systems. VM Management server 150 may obtain VM information through various ways. For example, VC 150 may remotely synchronize with VMMs within the network, or VMMs may update VM Management server 150 whenever status change happens with VMs. In this example, VM Management server 150 is communicatively coupled with backup application server 105 and clients 101 and 102.

A user operating VM Management server 150 can initiate a request to backup with a VM identifier (indicating VM 209 in this example). VM Management server 150 identifies that client 102 manages VMM 207, which hosts VM 209. VM Management server 150 requests VMM 207 to establish a consistent state of VM 209, or a snapshot. Client 102 is communicatively coupled with storage system 180. The snapshot could be one of a VM disk file 186 of storage system 180. The snapshot is analyzed by VMM 207 to exclude files that satisfy a predetermined criterion such as a user selection to exclude these files because they are unessential files for virtual machine restorations. Examples of such files include temporary files and system page file. VMM 207 then substitutes these predetermined files with data pattern files having repeats of a predetermined data segment before sending a modified version of the snapshot (e.g., the modified representation of the snapshot) to a deduplication module such as dedup logic 152. Dedup logic 152 then deduplicates the modified representation of the snapshot. The deduplicated modified representation of the snapshot is transmitted to the backup storage system 104 for storage. In one embodiment, VM Management server 150 and backup application server 105 may be integrated as a single system.

In one embodiment, backup storage system 104 includes, but is not limited to, deduplication logic 107, and one or more storage units or devices 108-109 communicatively coupled to each other. Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network. Note that in one embodiment, backup application server 105 and backup storage system 104 are integrated into one single system.

In response to a data file to be stored in storage units 108-109, optionally deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to backup deduplicated data from client systems 101-102 and to store the data in one or more of storage units 108 of backup storage system 104. In this example, a user initiates a backup request of a VM, such as VM 209 within client 102. VMM 207 generates a snapshot of VM 209. Client 102 is communicatively coupled with storage system 180. The snapshot could be one of a VM disk file 186 of storage system 180. The snapshot is analyzed by VMM 207 to exclude files that satisfy a predetermined criterion. A user can specify a particular file (e.g., filename) or a particular type of files to be excluded from backup. An example of a criterion could be a user selection to exclude one or more files because they are unessential files for virtual machine restorations. VMM 207 then substitutes these predetermined files with data pattern files having repeats of a predetermined data segment for a modified representation of the snapshot (e.g., the snapshot excluding the one or more files in substitution of a predetermined data pattern). The file substitution could be performed at the OS level or at a physical storage level, block by block. Dedup Logic 152 then deduplicates the modified representation of the snapshot. The deduplicated modified representation of the snapshot is transmitted to the backup storage system 104 for storage.

As shown in FIG. 1, the to-be-backed-up VM 113 resides on client 102. Client 102 includes one or more VMs 209-211 hosted by VMM 207. VMM 207 also includes an application programming interface (API) 132, through which VMM 207 manages VMs 209-211. In one embodiment, the API is a VM API such as VMware's vStorage APIs for Data Protection (VADP). In one embodiment, a user requests the backup from backup application server 105. In another embodiment, a user requests the backup from storage system 180. In another embodiment, a user requests the backup from VM Management server 150.

Storage system 180 may include any type of server or cluster of servers. For example, storage system 180 may be a storage server used for any of various different purposes, such as to provide multiple users with access to shared data and/or to back up mission critical data. Storage system 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 180 may have a distributed architecture, or all of its components may be integrated into a single unit. Storage system 180 may be implemented as part of a storage system available from EMC® Corporation of Hopkinton, Mass.

Storage system 180 contains backup logic 184 that manages both backup and restore processes within the storage system. Storage system 180 also contains VM disk files 186 that are the content files of the VMs. Note that a storage system of a client may also be called the primary storage of the client to distinguish the storage from backup storage systems.

A virtual machine represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources. Here VMM 207 manages both VM 209 and VM 211.

In one embodiment, dedup logic 152 of storage system 180 divides the disk snapshots into segments and copies only the segments that do not already exist in backup storage system 104 when backup storage system 104 is a deduplicating storage system. In one embodiment, the segments are variable sized and the segment boundaries are defined by the content of the data. Such segments (also referred to as chunks) may be segmented within storage system 180 using a predetermined chunking algorithm. For each of the segments, a fingerprint is generated using a predetermined hash function. Storage system 180 may initially transmit fingerprints of the segments to backup storage system 104 without transmitting the actual segments. Based on the fingerprints received from storage system 180, deduplication storage engine 107 may determine which of the segments have already been stored in storage units 108-109, for example, by comparing the fingerprints received from storage system 180 and those maintained locally within backup storage system 104. For those segments that have not been stored in storage units 108-109, backup storage system 104 transmits identifying information of the missing segments to storage system 180, such as the fingerprints of the missing segments. In response, storage system 180 identifies the missing segments based on the identifying information received from backup storage system 104 and only transmits the missing segments over to backup storage system 104.

Figure 2:
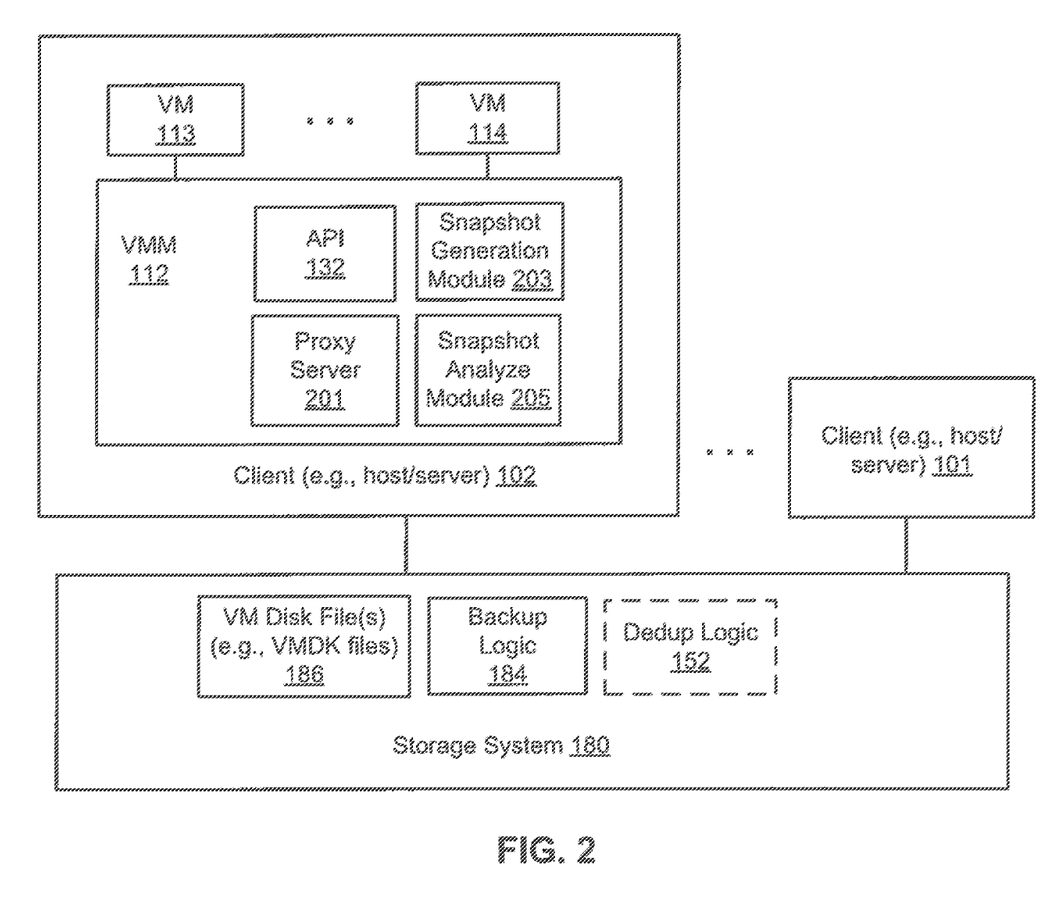
FIG. 2 is a block diagram illustrating clients and a storage system according to one embodiment.

In one embodiment, via API 132 of FIG. 2, backup engine 106 collects attributes associated with the VM being backed up (e.g. CPU, memory, disk configuration) and stores the VM attributes in backup catalog 122. The attributes are subsequently used to provision a new VM to be the target of restoration.

FIG. 2 is a block diagram illustrating clients and a storage system according to one embodiment. Referring to FIG. 2, VMM 207 includes, but is not limited to, API 132, proxy server 201, snapshot generation module 203, and snapshot analyze module 205. API 132 allows any external system to communicate with VMM 207. For example, backup application server 105 can send request to VMM 207 via API 132 to initiate a backup operation. In another example, backup application server 105 can establish a consistent state of a VM stored on client 102 and to request for a backup catalog of the VM via API 132. Proxy server 201 can let VMM 207 mount any VMs hosted on the client and to access files of the VMs. Snapshot generation module 203 can establish consistent states of VMs on the client. Snapshot analyze module 205 can analyze files from a snapshot. For example, backup application server 105 may send a backup request for VM 209 to VMM 207 via API 132. Snapshot generation module 203 of VMM 207 thereafter establishes a consistent state, or a snapshot, for VM 209. The snapshot may be one of VM disk files, or VMDK file 186. Proxy server 201 mounts the snapshot to allow file access to the snapshot. Snapshot analyze module 205 searches for one or more files to be excluded from the backup routine via the mounted VM disk file at proxy server 201. These one or more files can be searched by file names and or file directories. Once these files are located, snapshot analyze module 205 determines their file addresses and file sizes to substitute them with data pattern files that have the same file sizes.

To prepare the data pattern files, in one embodiment, snapshot analyze module 205 first determines a granule size of the data pattern for the smallest non-repeating sequence of bits of the data pattern. For example, snapshot analyze module 205 can call a system architecture function to determine that the virtual machine is running in a 32-bits or 64-bits environment and uses this information as one basis for the granule size. In another embodiment, the snapshot analyze module 205 can determine the granule size based on a predetermined data pattern for the particular client and/or VM. In another embodiment, the snapshot analyze module 205 can determine the granule size based on a user selection of a data pattern from a predefined set of data patterns. In another embodiment, the snapshot analyze module 205 can determine the granule size based on a randomly generated non-repeating sequence of bits for a granule.

Once a granule size is determined, snapshot analyze module 205 allocates memory having the granule size. Snapshot analyze module 205 writes a predetermined data pattern to the allocated memory and backs up the allocated memory data in place of content of the one or more files within the snapshot, repeatedly from beginning of the file address until the end of file. For example, in one embodiment, proxy server 201 reads the physical addresses from the beginning to the end of a VMDK or the snapshot per 64 KB s and hashes the 64 KB data trunk to check whether the 64 KB data trunk is a duplicate before the data trunks are sent to a backup server system. For the physical addresses of the one or more files to be excluded, a predetermined data pattern on the allocated memory is backed up in place of the contents of the one or more files. Essentially, proxy server 201 does not even read the content at these addresses, thereby dynamically backing up a modified representation of the snapshot (e.g., the snapshot to exclude one or more files within the snapshot).

In one embodiment, the predetermined data pattern is a non-zero meaningful data pattern, having a non-repeating granule or smallest sequence such as 0xdeadbeef. In some embodiments, more than one data patterns can be used. In one embodiment, each client has a different data patterns that can be used to distinguish between these clients, i.e., client 101 has a first predetermined data pattern different from a second predetermined data pattern for client 102. In another embodiment, different VMs can have a different data pattern. In another embodiment, different timeframes of the VMs can have a different data pattern. Here, different data patterns can be used as a signature uniquely to identify snapshots belonging to different clients and/or VMs and/or timeframes. Since the one or more files have been substituted with repeated data pattern, when dedup logic 152 performs the deduplication, the files will be literally compressed because only the unique segments will be transmitted to the target storage. For those requests having repeated predetermined data pattern, at most, only a first segment of the data pattern will be transmitted to the target storage system. The remaining segments will not be transmitted since they are the duplicated segments. As a result, the network traffic can be significantly reduced.

Figure 3:
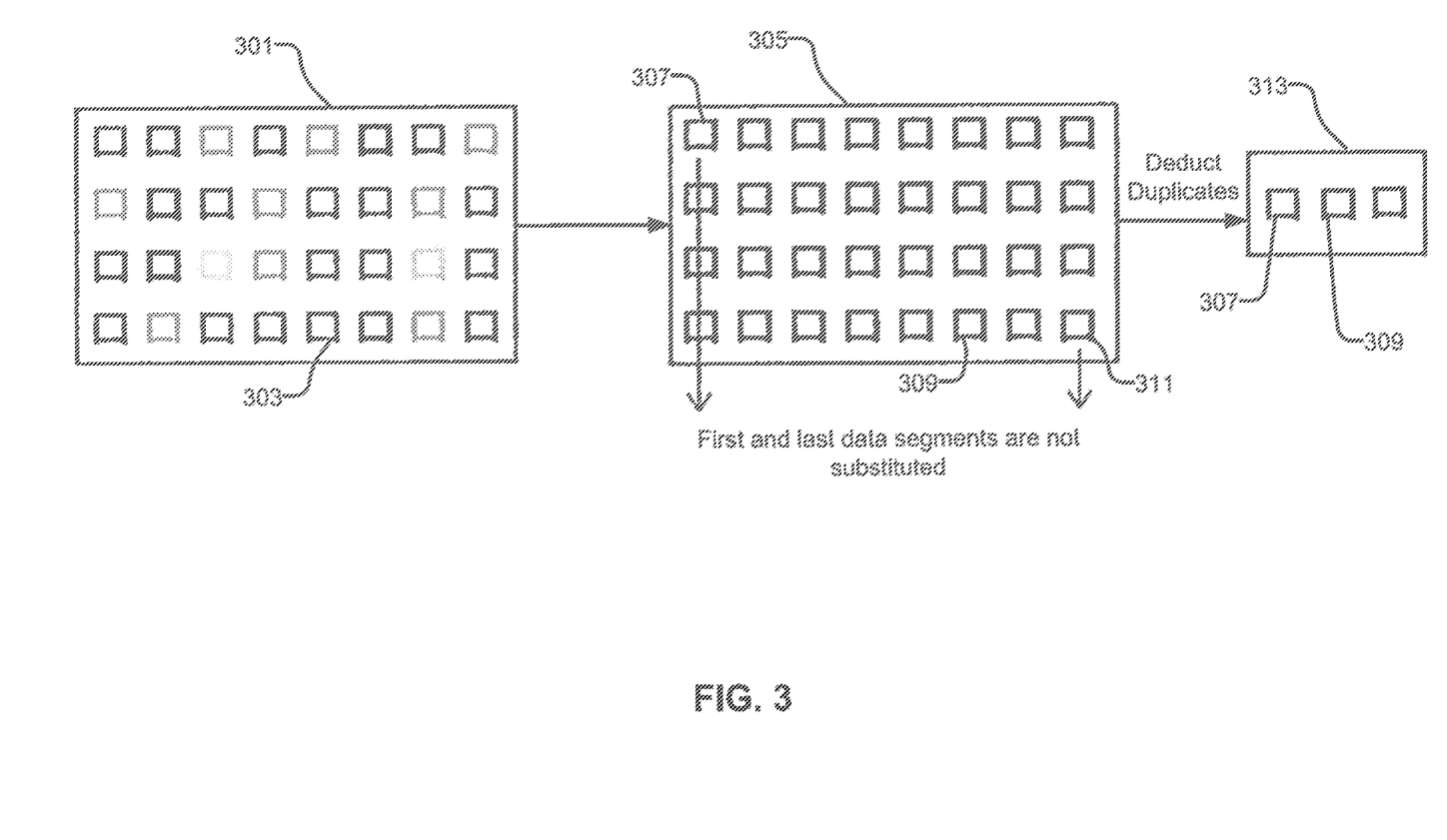
FIG. 3 is a block diagram illustrating substitution of a file with a predetermined data pattern according to one embodiment.

FIG. 3 is a block diagram illustrating substitution of a file with a predetermined data pattern according to one embodiment. Referring to FIG. 3, file 301 is substituted with file 305 having a predetermined data pattern. File 301 includes many data chunks or data segments 303. File 305 has many repeated data segments or data chunks 309. Data chunks 309 have a non-zero meaningful data pattern. In one embodiment, file 301 is a continuous file and data segment 303 is a 32 k, a 64 k data block, or any multiples of eight. A snapshot analyze module, such as snapshot analyze module 205 of FIG. 2, can dynamically back up file 301 by substituting data blocks 303 of file 301 with data blocks having a predetermined data pattern. In one embodiment, a first and/or a last data chunk, e.g., data chunks 307 and 311 of FIG. 3, is/are not substituted as these data blocks may contain data of other files. In another embodiment, all data blocks of file 301 are substituted. In one embodiment, file 301 data blocks are substituted with a predetermined non-zero data pattern, such as data block 309, such that when the one or more files is/are restored, restore logic allocates the same file sizes for the one or more files ensuring physical continuity of the file.

For example, if file 301 is substituted by a zero data pattern, upon image restoration, the file with zeros would not be allocated any storage capacity and the file, when restored, would be fragmented as soon as the system writes to it because data would be written to alternate addresses where storage capacity is available. If file 301 is substituted with a non-zero data pattern, upon restoration, the file would be allocated with the original file size and any subsequent overwrites or writes to the file under most scenarios would not require new storage allocations, thus, leading to fewer storage fragmentations. In one embodiment, a non-zero meaningful data pattern includes a data pattern with a predetermined granule such as 0xdeadbeef. In one embodiment, the one or more files include a system page file.

In one embodiment, a deduplication logic, such as dedup logic 152, can deduplicate file 305 before the file data chunks are sent to a backup storage system. Deduplication logic deducts duplicate data segments so that non-duplicates of the data chunks, e.g., data chunks 307, 309, and 311 in this example, are the only data chunks remaining to be transmitted to a backup storage system.

Figure 4:
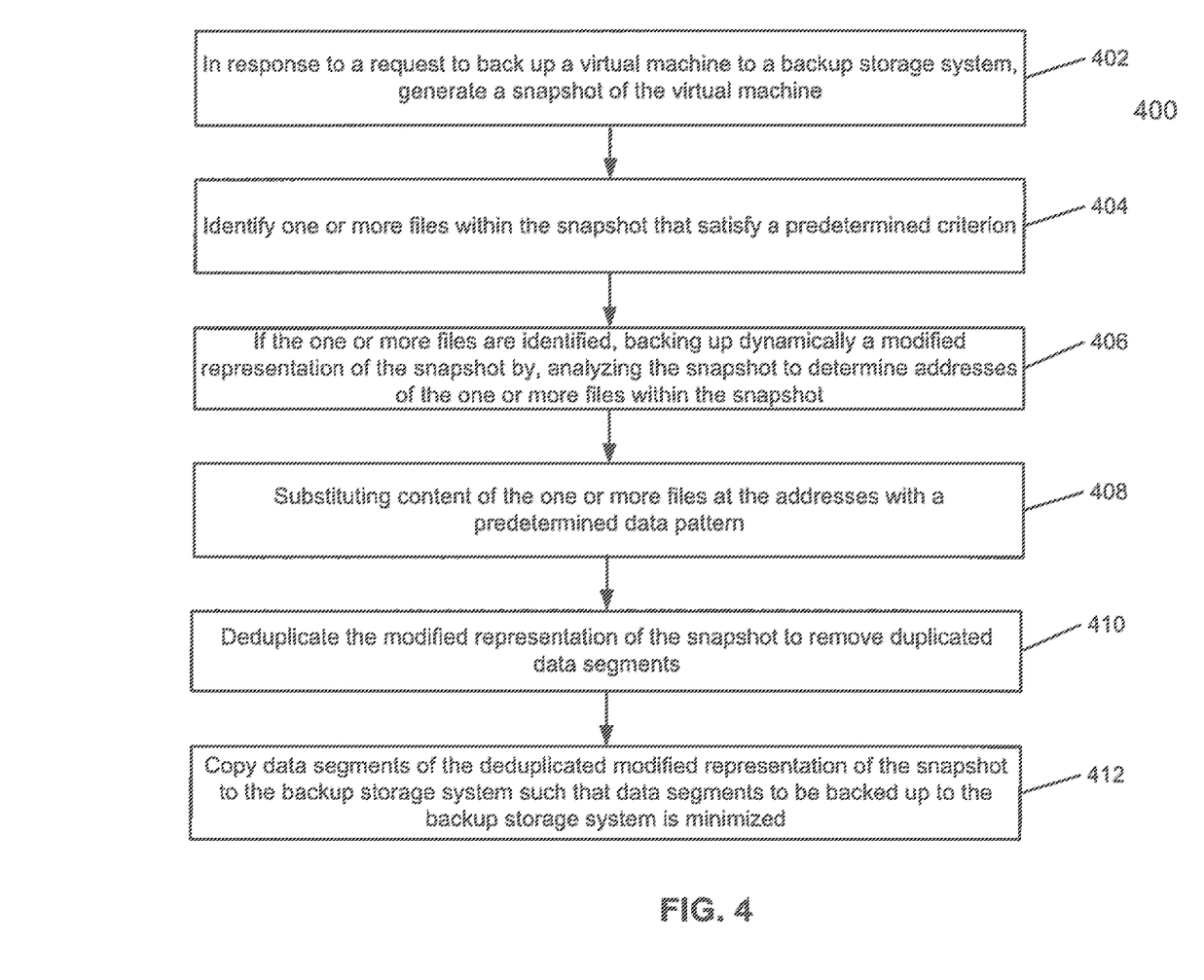
FIG. 4 is a flow diagram illustrating a method for backup according to one embodiment.

FIG. 4 is a flow diagram illustrating a data backup process according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by client 102 and/or storage system 180 of FIG. 1. Referring to FIG. 4, processing logic, at block 402, in response to a request to back up a virtual machine to a backup storage system, generates a snapshot of the virtual machine. At block 404, processing logic identifies one or more files within the snapshot that satisfy a predetermined criterion. At block 406, if the one or more files are identified, processing logic backs up dynamically a modified representation of the snapshot by, analyzing the snapshot representing a modification of the snapshot by, analyzing the snapshot to determine addresses of the identified one or more files within the snapshot. At block 408, processing logic substitutes content of the identified one or more files at the addresses with a predetermined data pattern. At block 410, process logic deduplicates the modified representation of the snapshot to remove duplicated data segments. At block 412, processing logic copies data segments of the deduplicated modified representation of the snapshot to the backup storage system such that data segments to be copied to the backup storage system is minimized.

In one embodiment, backing up dynamically a modified representation of the snapshot further includes mounting the snapshot of the virtual machine on a proxy server prior to analyzing the snapshot and unmounting the snapshot after the backup completes or terminates. In one embodiment, substituting the content of the identified one or more files with a predetermined data pattern includes determining a granule size of the predetermined data pattern, allocating memory having the granule size, writing the predetermined data pattern to the allocated memory, and substituting content of the identified one or more files with repeated sequence of the allocated memory data. In one embodiment, substituting content of the identified one or more files with repeated sequence of the allocated memory data includes consecutively substituting data segments of the identified one or more files with the predetermined data pattern at the allocated memory while excluding a first and a last data segment of each of the identified one or more files.

In one embodiment, the predetermined data pattern is a non-zero data pattern such that the predetermined data pattern of the modified representation of the snapshot when restored are allocated identical files sizes as the identified one or more files. In one embodiment, the identified one or more files include a system page file, such that a size of the system page file changes dynamically depending on virtual machine memory usages. In one embodiment, the snapshot is analyzed by searching for the identified one or more files by file names and/or file directories.

In one embodiment, de-duplicating the modified representation of the snapshot includes segmenting the modified representation of the snapshot into a plurality of data segments, and for each of the plurality of data segments, generating a fingerprint for the each data segment, determining whether content of the each data segment match at least one other data segment, and in the event that the contents of the each segment match, replacing the each data segment with a reference value to the at least one other data segment. In one embodiment, backing up the deduplicated modified representation of the snapshot includes for each of the deduplicated data segments, transmitting a fingerprint of the deduplicated data segment, but not the deduplicated data segment, to the backup storage system, determining if the backup storage system has already stored the deduplicated data segment by looking up the fingerprint, and in the event that the deduplicated data segment is not already stored in the backup storage system, transferring the deduplicated data segment to the backup storage system for storage. In one embodiment, identifying one or more files within the snapshot to satisfy a predetermined criterion includes determining the one or more files to be unessential for restoration purposes. In another embodiment, identifying one or more files within the snapshot to satisfy a predetermined criterion includes retrieving a user selection to exclude backing up of the one or more files from an end user.

Note that some or all of the components as shown and described above (e.g., snapshot analyze module 205 of FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
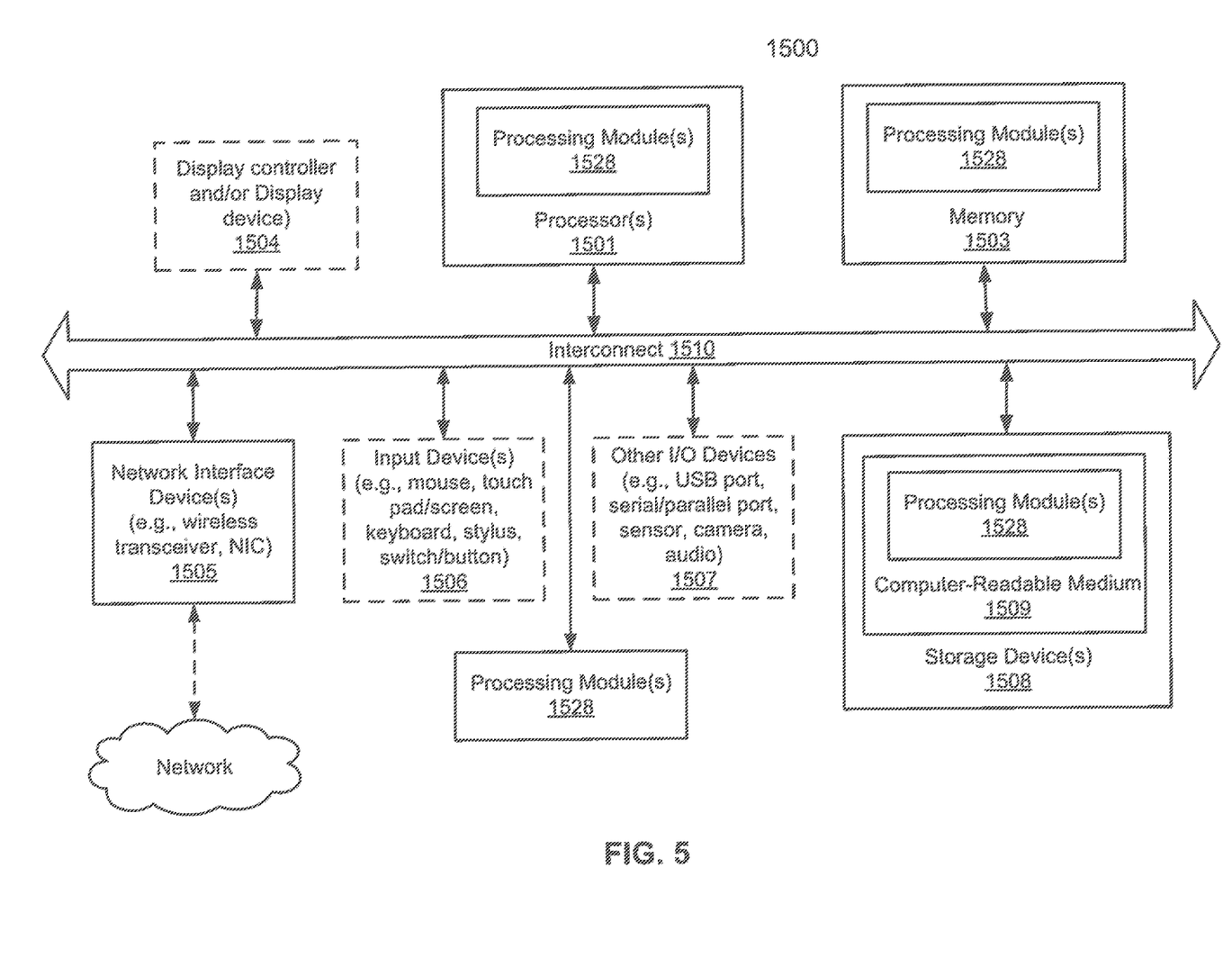
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems such as clients 101-102 and/or servers 104-106 and 150 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, snapshot generation module 203, snapshot analyze module 205, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to back up virtual machines, the method comprising:
   in response to a request to back up a virtual machine to a backup storage system, generating a snapshot of the virtual machine;
   identifying one or more unessential files within the snapshot, the unessential files being unessential for restoration purposes and comprise temporary files and system page file, wherein a size of the system page file changes dynamically depending on virtual machine memory usages;
   if the one or more unessential files are identified, backing up dynamically a modified representation of the snapshot by:
   analyzing the snapshot to determine addresses of the identified one or more unessential files within the snapshot; and
   substituting content of the identified one or more unessential files at the addresses with a data pattern of repeated predetermined data segments;
   deduplicating the modified representation of the snapshot to remove the repeated data segments such that only one copy of one of the repeated data segments will be sent to the backup storage system, only once; and
   copying data segments of the deduplicated modified representation of the snapshot to the backup storage system such that data segments to be copied to the backup storage system are minimized;
   wherein substituting the content of the identified one or more files with the data pattern of predetermined data segments comprises:
   determining a granule size of the data pattern;
   allocating memory having the granule size;
   writing the predetermined data segments to the allocated memory; and
   substituting content of the identified one or more files with repeated sequence of the allocated memory data;
   and wherein the predetermined data segment is a non-zero data pattern such that the non-zero predetermined data pattern of the modified representation of the snapshot when restored are allocated identical files sizes as the identified one or more files.

2. The method of claim 1, wherein backing up dynamically a modified representation of the snapshot further comprises:
   mounting the snapshot of the virtual machine on a proxy server prior to analyzing the snapshot; and unmounting the snapshot after backup completes or terminates.

3. The method of claim 1, wherein substituting content of the identified one or more files with repeated sequence of the allocated memory data comprises consecutively substituting data segments of the identified one or more files with the predetermined data segments at the allocated memory while excluding a first and a last data segment of each of the identified one or more files.

4. The method of claim 1, wherein the snapshot is analyzed by searching for the identified one or more files by file names and/or file directories.

5. The method of claim 1, wherein de-duplicating the modified representation of the snapshot comprising:
   segmenting the modified representation of the snapshot into a plurality of data segments;
   for each of the plurality of data segments,
      generating a fingerprint for the each data segment;
      determining whether content of the each data segment match at least one other data segment; and
      in the event that the contents of the each segment match, replacing the each data segment with a reference value to the at least one other data segment.

6. The method of claim 1, wherein backing up the deduplicated modified representation of the snapshot comprises:
   for each of the deduplicated data segments,
   transmitting a fingerprint of the deduplicated data segment, but not the deduplicated data segment, to the backup storage system;
   determining if the backup storage system has already stored the deduplicated data segment by looking up the fingerprint; and
   in the event that the deduplicated data segment is not already stored in the backup storage system, transferring the deduplicated data segment to the backup storage system for storage.

7. The method of claim 1, wherein identifying one or more files within the snapshot further comprises retrieving a user selection to exclude backing up of the one or more files from an end user.

8. The method of claim 1, wherein each client or virtual machine has a different predetermined data segment.

9. The method of claim 1, wherein each timeframes of the virtual machine has a different predetermined data segment.

10. A non-transitory machine-readable medium having instructions stored therein, which when executed by a processor, cause the processor to perform operations, the operations comprising:
    in response to a request to back up a virtual machine to a backup storage system, generating a snapshot of the virtual machine;
    identifying one or more unessential files within the snapshot the unessential files being unessential for restoration purposes and comprise temporary files and system page file, wherein a size of the system page file changes dynamically depending on virtual machine memory usages;
    if the one or more unessential files are identified, backing up dynamically a modified representation of the snapshot by,
    analyzing the snapshot to determine addresses of the identified one or more unessential files within the snapshot; and
    substituting content of the identified one or more unessential files at the addresses with a data pattern of repeated predetermined data segments;
    deduplicating the modified representation of the snapshot to remove the repeated data segments such that only one copy of one of the repeated data segments will be sent to the backup storage system, only once; and
    copying data segments of the deduplicated modified representation of the snapshot to the backup storage system such that data segments to be backed up to the backup storage system are minimized;
    wherein substituting the content of the identified one or more files with the data pattern of predetermined data segments comprises:
    determining a granule size of the data pattern;
    allocating memory having the granule size;
    writing the predetermined data segments to the allocated memory; and
    substituting content of the identified one or more files with repeated sequence of the allocated memory data;
    and wherein the predetermined data segment is a non-zero data pattern such that the non-zero predetermined data pattern of the modified representation of the snapshot when restored are allocated identical files sizes as the identified one or more files.

11. The non-transitory machine-readable medium of claim 10, wherein backing up dynamically a modified representation of the snapshot further comprises:
    mounting the snapshot of the virtual machine on a proxy server prior to analyzing the snapshot; and
    unmounting the snapshot after backup completes or terminates.

12. The non-transitory machine-readable medium of claim 11, wherein substituting content of the identified one or more files with the allocated memory data comprises consecutively substituting data segments of the identified one or more files with the predetermined data segment at the allocated memory while excluding a first and a last data segment of each of the identified one or more files.

13. The non-transitory machine-readable medium of claim 10, wherein each client or virtual machine has a different predetermined data segment.

14. The non-transitory machine-readable medium of claim 10, wherein each timeframes of the virtual machine has a different predetermined data segment.

15. A data processing system, comprising:
    a processor; and
    a memory coupled to the processor to store instructions, which when executed by the processor, cause the processor to perform operations, the operations including
    in response to a request to back up a virtual machine to a backup storage system, generating a snapshot of the virtual machine;
    identifying one or more unessential files within the snapshot the unessential files being unessential for restoration purposes and comprise temporary files and system page file, wherein a size of the system page file changes dynamically depending on virtual machine memory usages;
    if the one or more unessential files are identified, backing up dynamically a modified representation of the snapshot by,
    analyzing the snapshot to determine addresses of the identified one or more unessential files within the snapshot; and
    substituting content of the identified one or more unessential files at the addresses with a data pattern of repeated predetermined data segments;

deduplicating the modified representation of the snapshot to remove the repeated data segments such that only one copy of one of the repeated data segments will be sent to the backup storage system, only once; and copying data segments of the deduplicated modified representation of the snapshot to the backup storage system such that data segments to be backed up to the backup storage system are minimized;

wherein substituting the content of the identified one or more files with the data pattern of predetermined data segments comprises:

determining a granule size of the data pattern;

allocating memory having the granule size;

writing the predetermined data segments to the allocated memory; and substituting content of the identified one or more files with repeated sequence of the allocated memory data;

and wherein the predetermined data segment is a non-zero data pattern such that the non-zero predetermined data pattern of the modified representation of the snapshot when restored are allocated identical files sizes as the identified one or more files.

16. The data processing system of claim 15, wherein backing up dynamically a modified representation of the snapshot further comprises:

mounting the snapshot of the virtual machine on a proxy server prior to analyzing the snapshot; and unmounting the snapshot after backup completes or terminates.

17. The data processing system of claim 16, wherein substituting content of the identified one or more files with the allocated memory data comprises consecutively replacing data segments of the identified one or more files with the predetermined data segment at the allocated memory while excluding a first and a last data segment of each of the identified one or more files.

18. The data processing system of claim 15, wherein each client or virtual machine has a different predetermined data segment.

19. The data processing system of claim 15, wherein each timeframes of the virtual machine has a different predetermined data segment.

* * * * *